United States Patent
Black (10) Patent No.: US 10,796,846 B2
(45) Date of Patent: Oct. 6, 2020

(54) LONG RANGE COIL AND POWER SOURCE FOR A MAGNETIC FIELD GENERATOR

(71) Applicant: MATRIX DESIGN GROUP LLC, Newburgh, IN (US)

(72) Inventor: Tim E Black, Elberfeld, IN (US)

(73) Assignee: Matrix Design Group, LLC, Newburgh, IN (US)

(*) Notice: Subject to any disclaimer, the term of this patent is extended or adjusted under 35 U.S.C. 154(b) by 317 days.

(21) Appl. No.: 15/987,478

(22) Filed: May 23, 2018

(65) Prior Publication Data

US 2019/0362889 A1 Nov. 28, 2019

(51) Int. Cl.
| | |
|---|---|
| *H01F 27/28* | (2006.01) |
| *H01F 27/42* | (2006.01) |
| *G05B 9/02* | (2006.01) |
| *H01F 27/34* | (2006.01) |
| *H02H 5/12* | (2006.01) |
| *H02M 7/5387* | (2007.01) |

(52) U.S. Cl.
CPC .............. *H01F 27/42* (2013.01); *G05B 9/02* (2013.01); *H01F 27/2823* (2013.01); *H01F 27/34* (2013.01); *H02H 5/12* (2013.01); *H01F 2027/2842* (2013.01); *H02M 7/5387* (2013.01)

(58) Field of Classification Search
CPC ..... H01F 2027/2842; H01F 2027/2838; H01F 27/2823; H01F 27/42; H01F 27/34; H02H 5/12; G05B 9/02; H02M 7/5387
See application file for complete search history.

(56) References Cited

U.S. PATENT DOCUMENTS

| | | | | |
|---|---|---|---|---|
| 1,680,415 | A * | 8/1928 | Hengstenberg | H01F 27/027 336/65 |
| 2,935,427 | A * | 5/1960 | Hall | H01B 3/308 428/371 |
| 4,093,132 | A | 6/1978 | Christiana et al. | |
| 5,703,490 | A | 12/1997 | Kennedy | |
| 5,951,459 | A | 9/1999 | Blackwell | |
| 6,378,671 | B1 | 4/2002 | Carlson | |
| 6,762,645 | B1 * | 7/2004 | Grant | H03F 3/19 323/282 |
| 9,293,253 | B2 | 3/2016 | Calvert et al. | |
| 2014/0043128 | A1 * | 2/2014 | Goldbaum | H01F 7/202 336/186 |
| 2014/0266759 | A1 * | 9/2014 | Pryor | E02F 3/16 340/686.6 |
| 2019/0103817 | A1 * | 4/2019 | Lestician | H01F 27/2823 |

\* cited by examiner

*Primary Examiner* — Harry R Behm
(74) *Attorney, Agent, or Firm* — Martin IP Law Group; C. Richard Martin (57) ABSTRACT

An improved long range coil and driver assembly for a magnetic field generator wherein the driver and coil generate a large magnetic field is provided. The coil and driver assembly includes a source impedance control network which includes a plurality of pairs of resistors and amorphous noise suppression devices, and a coil that utilizes a unique basket weave winding pattern to reduce the effect of the back EMF from one wire on the adjoining wires, thereby reducing the impedance of the coil. The reduced impedance and improved impedance control increases the current that can flow creating a larger field.

4 Claims, 8 Drawing Sheets

LONG RANGE COIL AND POWER SOURCE FOR A MAGNETIC FIELD GENERATOR

BACKGROUND OF THE INVENTION

Field of the Invention

The present invention relates to coil and power source assemblies for magnetic field generators. More specifically, the present invention relates to an improved coil and power source assembly for a magnetic field generator that produces a substantially larger magnetic field than current generators.

Description of the Related Art

Safety systems for determining the location of workers and/or objects in dangerous environments such as underground mines utilize a magnetic field generator on the machine and a magnetic field sensor carried by the operator to prevent operators from inadvertently coming into contact with a machine and being injured or killed. The magnetic field generator creates a magnetic field around the machine. The magnetic field sensor senses the strength of the magnetic field and then relays the strength of the field by radio back to the machine. If the operator is determined to be too close to the machine, the machine is shut down. However, this system is limited to the range of magnetic field created around the perimeter around the machine. A typical system used today has a range of about eighty (80) feet in radius from the magnetic field generator.

A bigger (larger diameter and/or longer) core will always produce a larger field. However, in the field there are packaging constraints such that it is desired to have a core no longer than 12 inches and a diameter no wider than 3 inches. The field created is influenced by the physical dimensions of the coil, the number and pattern of wire turns, and amount of current flowing through the wire. Winding this core with a conventional set of helical turns is limited to about 6× the magnetic field strength of the existing coil design by the fact that more turns create more impedance and more impedance reduces the available current. A wide range of windings come up against this limit where more turns would make a bigger field, but more turns reduce the current and reduce the field.

Accordingly, there is a need for a coil and driver assembly for a magnetic field generator that has a greater range (200+ feet) while remaining within the packaging constraints referenced above. This takes an increase of at least 8× to 10× the magnetic field strength of the existing design.

There is also a need for a coil having a unique winding pattern that allows for more turns in the winding without unduly increasing the impedance.

There is further a need for a power source/driver that includes a high power H bridge switching system. This switching system is enhanced by a unique source impedance control network to more effectively control the switching speed of the control system. This is needed because of the increase in power required to produce such a large magnetic field.

SUMMARY OF THE INVENTION

It is therefore an object of the present invention to provide a coil and driver assembly for a magnetic field generator that has a power increase of up to 14× the magnetic field strength of the existing device, giving a range of 200+ feet, while remaining relatively small in size.

It is also an object of the invention to provide a unique coil for a magnetic field generator that allows for more and larger turns in the winding without unduly increasing the impedance.

A further object of the invention is to provide an improved power source that includes a unique source impedance control network to more effectively control switching time and energy recovery from the coil. This is needed due to the increase in power required to produce such a large magnetic field.

The present invention meets these objects by providing a long range coil and power source for a magnetic field generator wherein the power source includes a source impedance control which includes a plurality of pairs of resistors and amorphous noise suppression devices in a unique component network and a coil that utilizes a unique basket weave winding pattern to reduce the effect of the back EMF from one wire on the adjoining wires, thereby reducing the impedance of the coil. The reduced impedance and improved power source switching control increases the current that can flow creating a larger field.

According to one presently preferred embodiment of the invention, there is provided a long range coil and power source for a magnetic field generator comprising a driver circuit and a coil. The driver circuit includes an input electrically coupled to a controller. The driver generates an electric current in response to electrical signals from the controller. The coil includes a core and a conductive wire wound about the core in a basketweave pattern. The two ends of the conductive wire are electrically coupled to an output of the driver circuit for receiving the current to create a magnetic field.

The coil core may comprise a magnetically permeable cylinder having a hollow center, and the driver circuit may be an H-bridge circuit, said H-bridge circuit further including a source impedance control network.

The long range coil and power source may further include a first end cap formed from a non-conductive material covering a first end of the coil and a second end cap formed from a non-conductive material covering a second end of the coil. Each end cap is provided with a plurality of anchor points such that the conductive wire is wound about the anchor points alternating between anchor points on the first end cap and anchor points on the second end cap such that the alternating anchor points are radially offset from one another and the wire is wound about the core in a single direction. According to a further aspect of the invention, the conductive wire engages a first anchor point on the first end cap at a point proximate to a first end of the conductive wire. The conductive wire then traverses the length of the coil to a second anchor point on the second end cap which is 200 degrees offset from the first anchor point on the first end cap. Next, the conductive wire traverses the length of the coil to a third anchor point radially adjacent to the first anchor point on the first end cap. The conductive wire further traverses the length of the coil repeating the above winding pattern for each additional anchor point on the first and second end caps. Finally, the conductive wire engages the first anchor point on the first end cap at a point proximate to a second end of the conductive wire.

According to an alternative embodiment of the invention, there is provided a long range coil and power source for a magnetic field generator comprising a driver circuit and coil. The driver circuit may include an input electrically coupled to a controller. The driver generates an electric current in response to electrical signals from the controller. The coil comprises a magnetically permeable cylinder core having a hollow center and a conductive wire wound about the magnetically permeable cylinder core. The two ends of the conductive wire are electrically coupled to an output of the driver circuit for receiving the current to create a magnetic field.

The conductive wire may be wound about the magnetically permeable cylinder core in a basketweave pattern. The driver circuit may be an H-bridge circuit which includes a source impedance control network.

According to another aspect of the invention, a non-conductive filler material may be located in the hollow center of the core. The magnetically permeable cylinder may comprise a plurality of component parts bound together by a binding material. According to one aspect of the invention, the plurality of component parts comprise a plurality of ferrite bars positioned side by side and the binding material comprises a low viscosity epoxy.

According to a further alternative embodiment of the invention, there is provided a long range coil and power source for a magnetic field generator comprising a driver circuit and coil. The driver circuit comprises an H-bridge circuit which includes a source impedance control network. The driver circuit may include an input electrically coupled to a controller. The driver generates an electric current in response to electrical signals from the controller. The coil may comprise a core and a conductive wire wound about the core. A first end and a second end of the conductive wire are electrically coupled to an output of the driver circuit for receiving the current to create a magnetic field.

The conductive wire may be wound about the magnetically permeable cylinder core in a basketweave pattern. The coil core may comprise a magnetically permeable cylinder having a hollow center.

According to a further aspect of the invention, the source impedance control network includes a plurality of resistor/amorphous noise suppression device pairs. Each pair includes a resistor connected to a corresponding amorphous noise suppression device by a substantially U-shaped conductive wire such that the resistor and the amorphous suppression device are positioned adjacent to one another. The orientation of adjacent pairs of resistor/amorphous noise suppression devices alternate so that the resistor of a first resistor/amorphous noise suppression device is positioned adjacent to the amorphous noise suppression device of a second resistor/amorphous noise suppression device. Each of the pairs of resistor/amorphous noise suppression devices are connected in parallel by a wire that is electrically coupled to the substantially U-shaped wire of each pair of resistor/amorphous noise suppression devices at a position between the resistor and the amorphous noise suppression device. A first end of the substantially U-shaped conductive wire of each pair may be connected in parallel with the first end of each of the substantially U-shaped conductive wire to each of the other pairs and to the H-bridge circuit. Similarly, a second end of the substantially U-shaped conductive wire of each pair is connected in parallel with the second end of each of the substantially U-shaped conductive wire to each of the other pairs and to the H-bridge circuit. Preferably, a pair of impedance control networks are provided as a part of the H-bridge circuit.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 1:
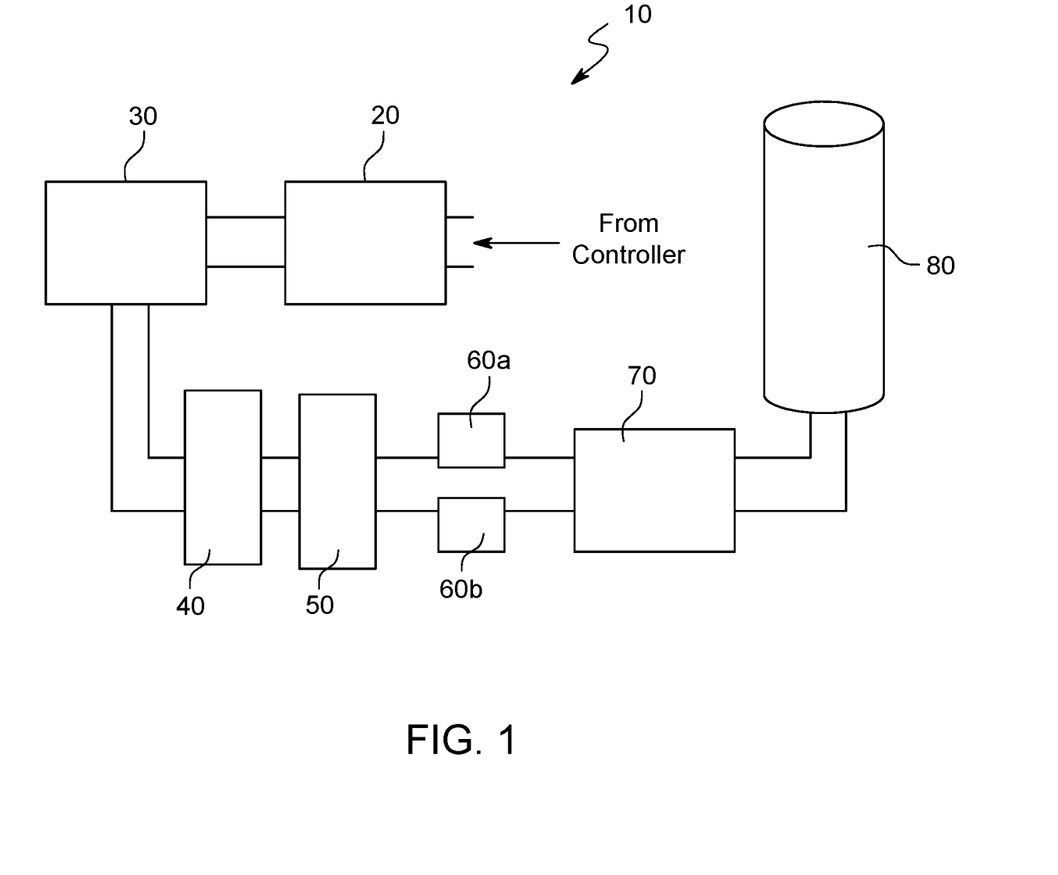
FIG. 1 is a block diagram of an improved long range coil and power source for a magnetic field generator according to a preferred embodiment of the invention.

As best shown in FIG. 1, one presently preferred embodiment of the invention comprises an improved long range driver 10 including an input protection circuit 20, level shifter circuit 30, signal decoding circuit 40, edge timing circuit 50, pre-drivers 60a, 60b, coil driver 70 and coil 80. A magnetic proximity signal is generated by the controller (not shown) and passed on to the driver(s) 10 through the input protection circuit 20. The components of the input protection circuit 20 perform a DC restoration function to recover from the AC coupling at the controller output. The level shifter circuit 30 conditions the input signals to the appropriate voltage levels. The signal decoding circuit 40 ensures that desired logic levels are conveyed to the edge timing circuit 50.

The input signals at the edge timing circuit 50 are inverted to produce separate complementary outputs. This is needed because the H-bridge has three valid states. (Off, drive A, drive B) This is to allow the burst mode operation, but also allows PWM of the drive values if that becomes needed. These signals are fed to four identical timing MOSFET circuits. The MOSFET switching signals are then passed to the high voltage gate pre-drivers 60a, 60b. Components of each pre-driver 60a, 60b act as bootstrap power to elevate the high side gate.

Figure 2:
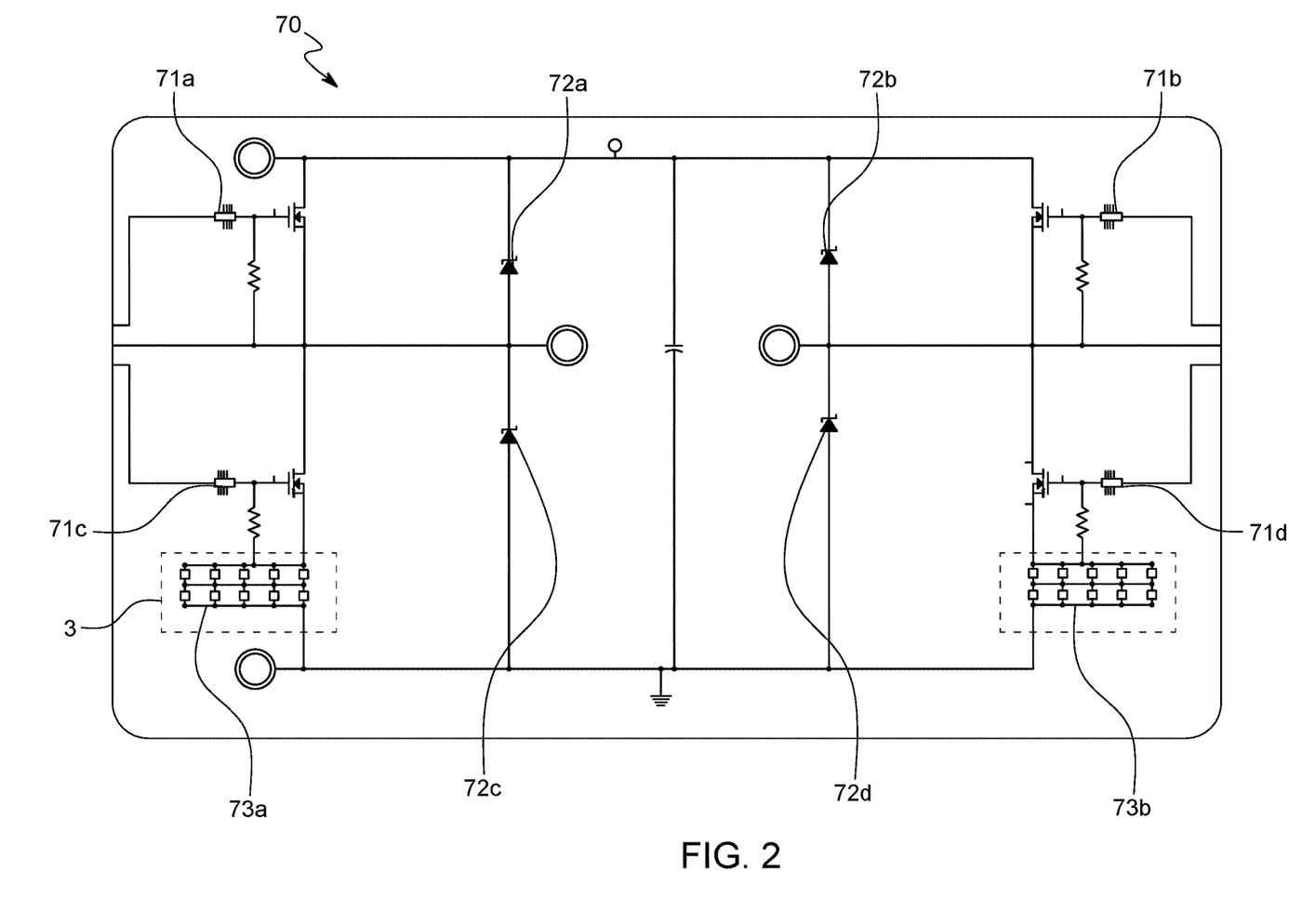
FIG. 2 is a schematic diagram of an improved coil power source of the improved long range coil and power source shown in FIG. 1 according to a preferred embodiment of the invention.
Figure 3:
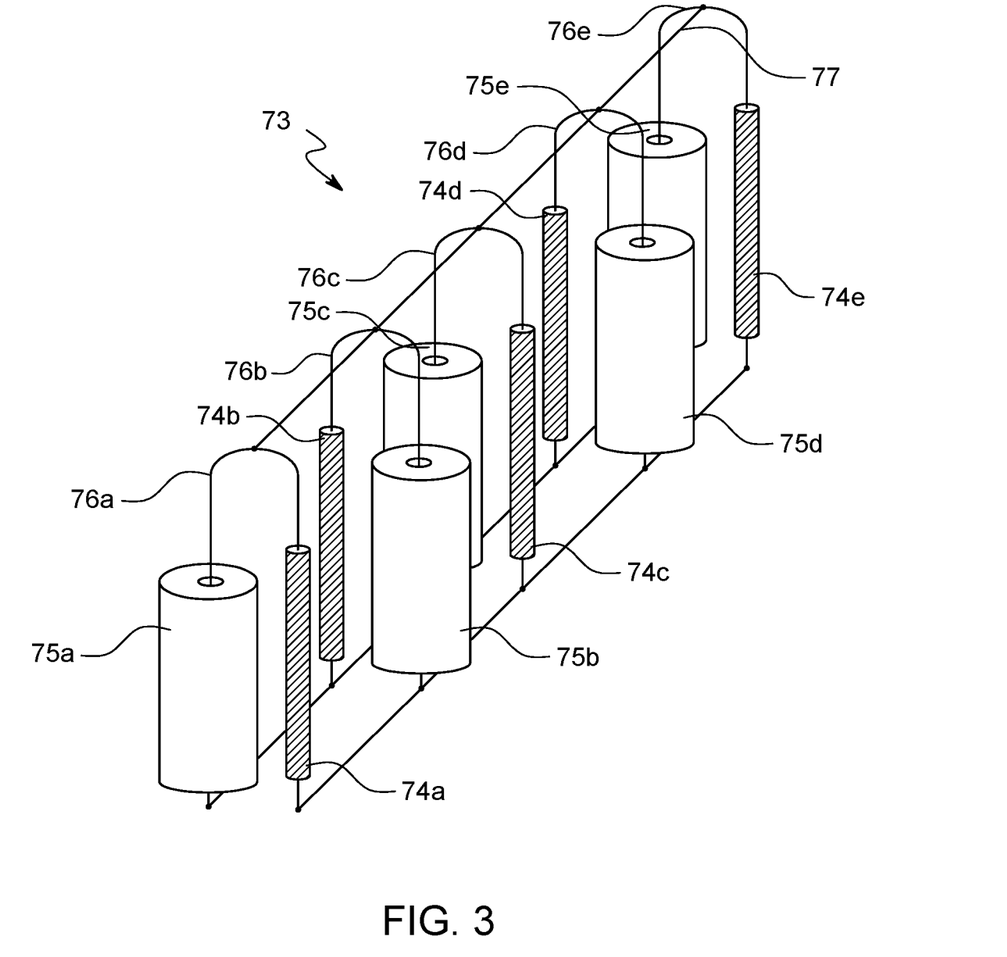
FIG. 3 is a perspective view of the source impedance control network of the area indicated by dashed lines and the number 3 from the coil driver shown in FIG. 2.

As best shown in FIG. 2, the coil driver 70 is preferably an H-bridge driver circuit. Standard gate resistors 71a, 71b, 71c, 71d are provided at the four inputs to the coil driver 70 to make the switching a little slower and limit Dv/Dt. A set of bypass diodes 72a, 72b, 72c, 72d are provided to reduce the current through the MOSFET body diodes. Source Impedance Control Networks 73a, 73b are provided and are critical to getting clean switching at the crossover. The source impedance control network 73 according to a preferred embodiment of the invention is shown in FIG. 3. The source impedance control includes a five resistors 74a, 74b, 74c, 74d, 74e, preferably 0.05 ohm resistors, and five amorphous noise suppression devices 75a, 75b, 75c, 75d, 75e in a series/parallel set. The amorphous noise suppression devices suppress rapid changes in current which could otherwise lead to electrical noise in the circuit. The preferred embodiment utilizes AMOBEADS® which are structurally optimized for use with single turn windings and are intended for applications where they are simply slipped over the leads of the component to be quieted. Each pair of resistors/AMOBEADS® (i.e. 74a, 75a) are connected in series by a lead wire 76a, but the lead wire is bent into a u-shape so that the bodies of the resistor/AMOBEADS® are adjacent to one another as shown in FIG. 3. The adjacent pairs of resistors/AMOBEADS® (i.e. pair 74a, 75a and pair 74b, 75b) are flipped so that the orientation of each pair alternates.

Energy is stored and recycled in a 500V 1500 uF high current capacitor 76. During each half-cycle of the drive waveform, energy from this capacitor is switched to cause a rising magnetic field from the main coil. Then there is a small "dead time" where all the power switches are off and energy starts to recycle into the main capacitor through the bypass diodes. After the "dead time" the switches reverse polarity and the remaining energy in the coil is returned to the capacitor before the magnetic field is expanded in the opposing direction.

Figure 4:
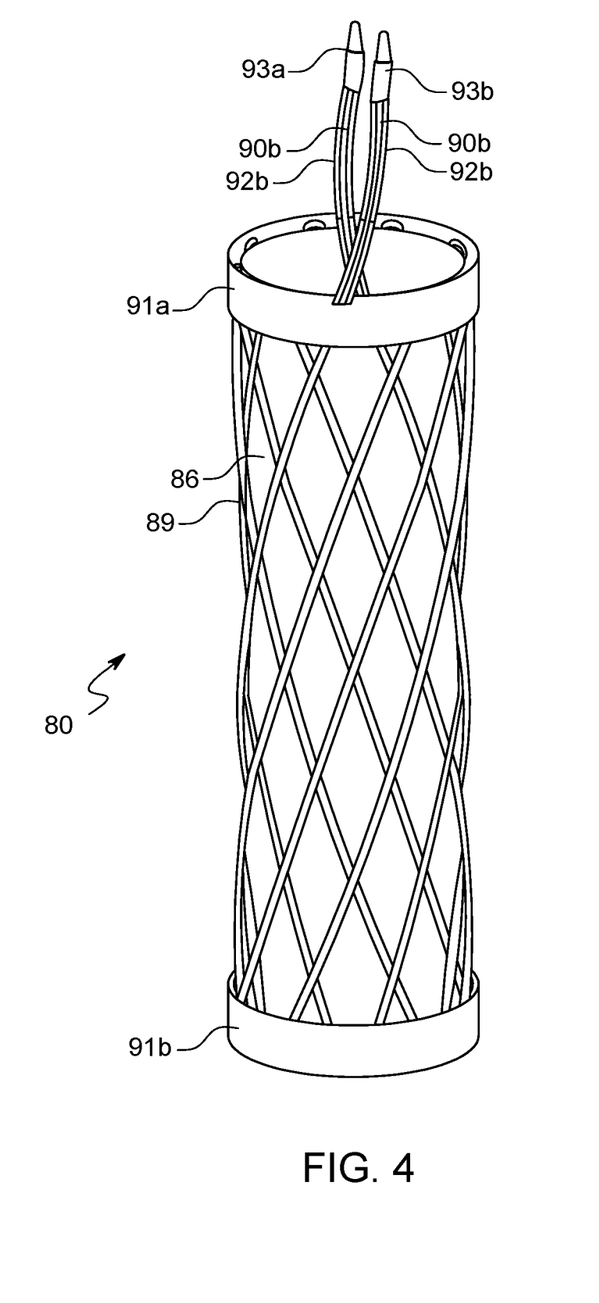
FIG. 4 is a perspective view of an improved coil of the improved long range coil and power source shown in FIG. 1 according to a preferred embodiment of the invention.
Figure 5A:
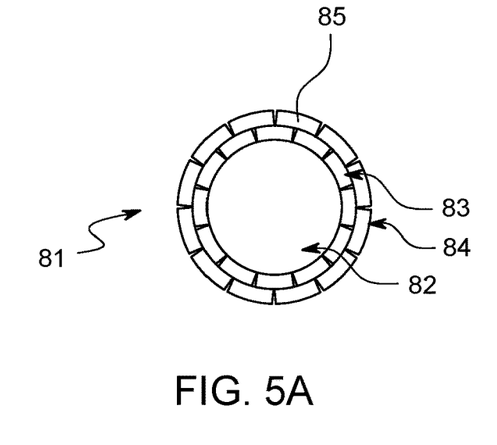
FIG. 5A is a top plan view of the core of the coil assembly shown in FIG. 4 according to a preferred embodiment of the invention.
Figure 5B:
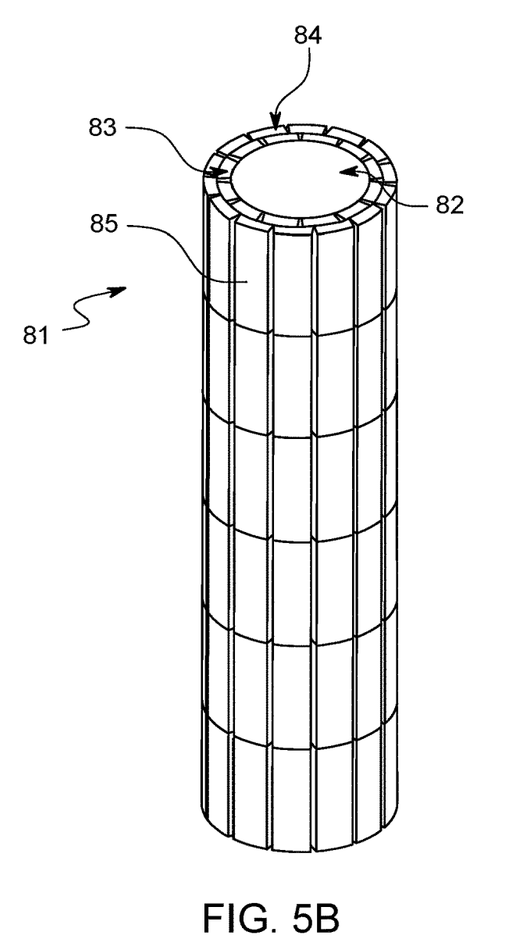
FIG. 5B is a perspective view of the core of the coil assembly shown in FIG. 4 and FIG. 5A according to a preferred embodiment of the invention.

The driver coil according to a preferred embodiment of the invention is shown in FIG. 4. FIGS. 5A-5E show the various components of the coil. As best show in FIG. 5A and FIG. 5B, the coil 80 includes a core 81 which includes a non-conductive inner core 82, an inner magnetic ferrite ring 83 and an outer magnetic ferrite ring 84. The inner core 82 may constitute a hollow void which may be filled with a non-conductive filler material such as paper, foam, sand, glass beads, fire block or the like. The purpose of the filler material is to provide structural integrity to the core 81 and to fill any air gaps that may be present in the inner core 82. The inner ring 83 and outer ring 84 are formed form a plurality of ferrite bars 85 which are wrapped around the inner core 82. Alternatively, a single magnetic ferrite ring may be used if the single ring is of sufficient thickness to obtain the desired results. According to the preferred embodiment of the invention, each ferrite bar 85 is formed of a ferromagnetic material, preferably compounds produced from transition metals and iron, such as MnZn. Each ferrite bar is preferably 1.97 inches tall, 0.59 inches wide and 0.20 inches thick. The inner ring 82 consists of twelve (12) ferrite bars 85 wrapped around a 2.1" 90-110 lb paper center core as shown in FIG. 5A and FIG. 5B. The outer ring consists of 14 ferrite bars wrapped around the inner ring. Low viscosity epoxy may be used to fill the spaces in between the bars 85 and to secure the bars together. As shown in FIG. 5B, the pattern is repeated until there are six (6) secure stacks of inner ring and outer ring ferrite bars around the inner core. The resulting core 81 is approximately 12 inches long with an outer diameter of approximately 3 inches.

Figure 5C:
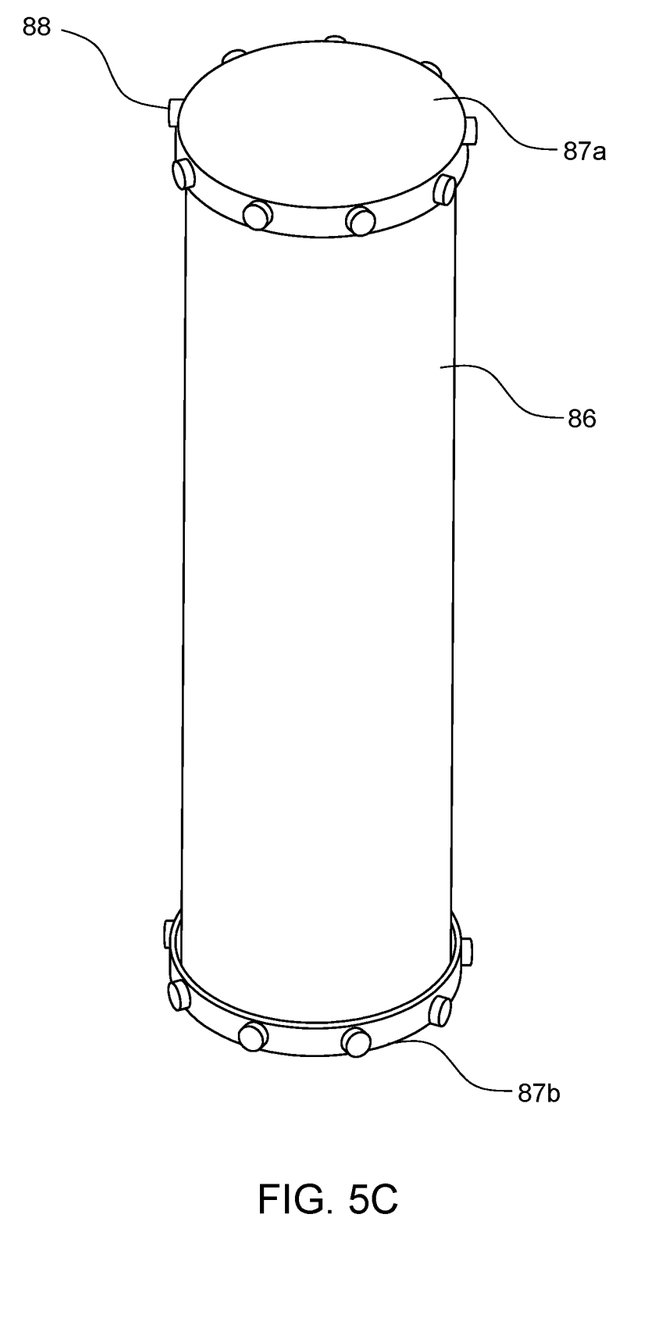
FIG. 5C is a perspective view of a partially assembled coil assembly shown in FIG. 4 according to a preferred embodiment of the invention, shown with a non-conductive sheet covering the core.

As shown in FIG. 5C, the core 81 is then wrapped with a sheet of non-conductive material 86, which is preferably 90-110 lb paper. Another method is to fully encapsulate the core 81, in this case the layer of non-conductive material 86 is not needed. End caps 87a, 87b are then inserted over each end of the covered core. Each end cap 87a, 87b is formed from a non-conductive material, preferably a thermoplastic material such as ABS or ASA plastic. Each end cap also includes a plurality of evenly spaced anchor points 88 extending outwardly about the periphery thereof. Preferably there are nine (9) anchor points about the periphery of each end cap 87a, 87b for a total of eighteen (18) anchor points in all. The end caps can be secured in place by any suitable adhesive.

Figure 5D:
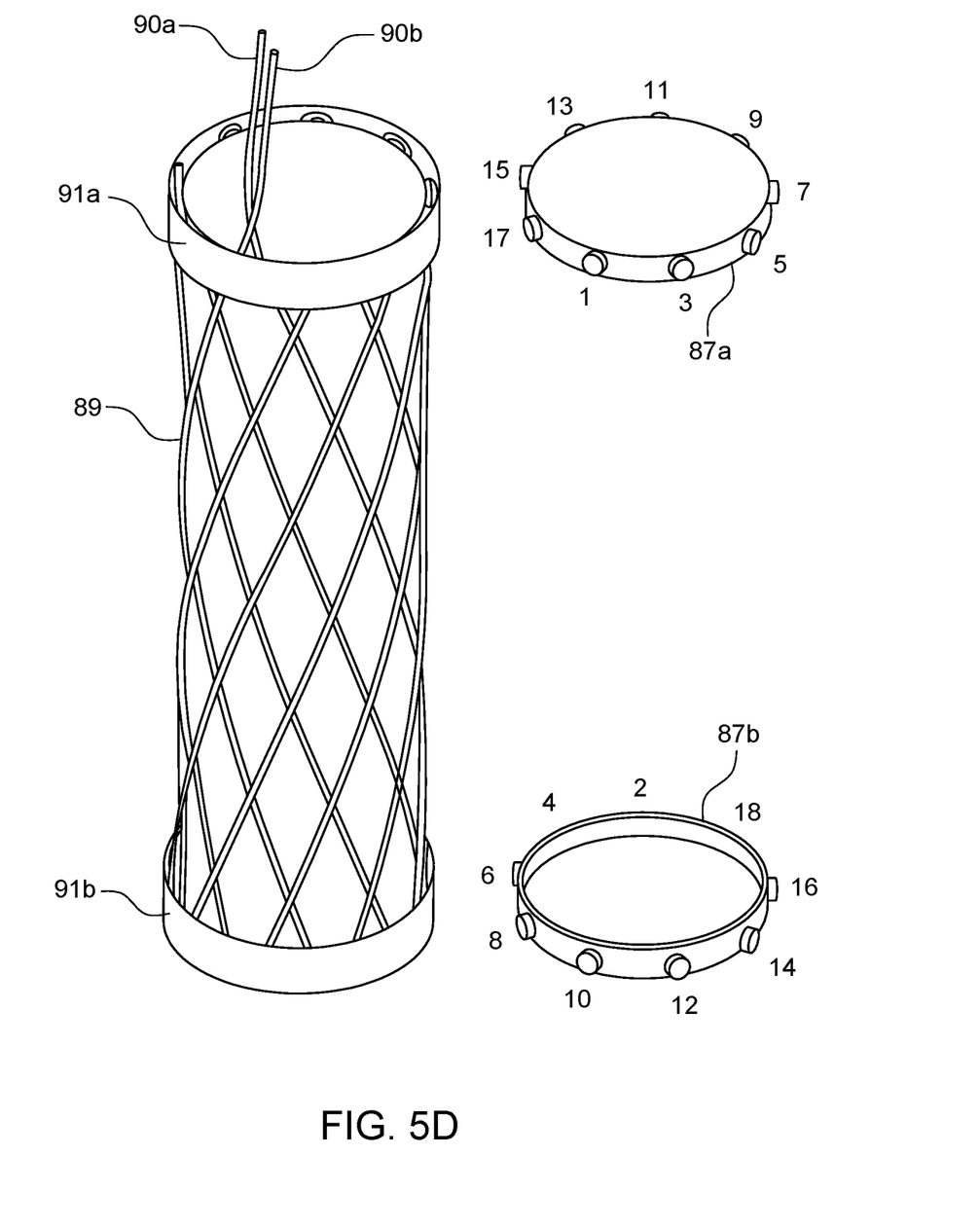
FIG. 5D is a perspective view of a partially assembled coil assembly shown in FIG. 4 according to a preferred embodiment of the invention, shown with the wire winding and end covers in place and details of the end caps off to the side.
Figure 5E:
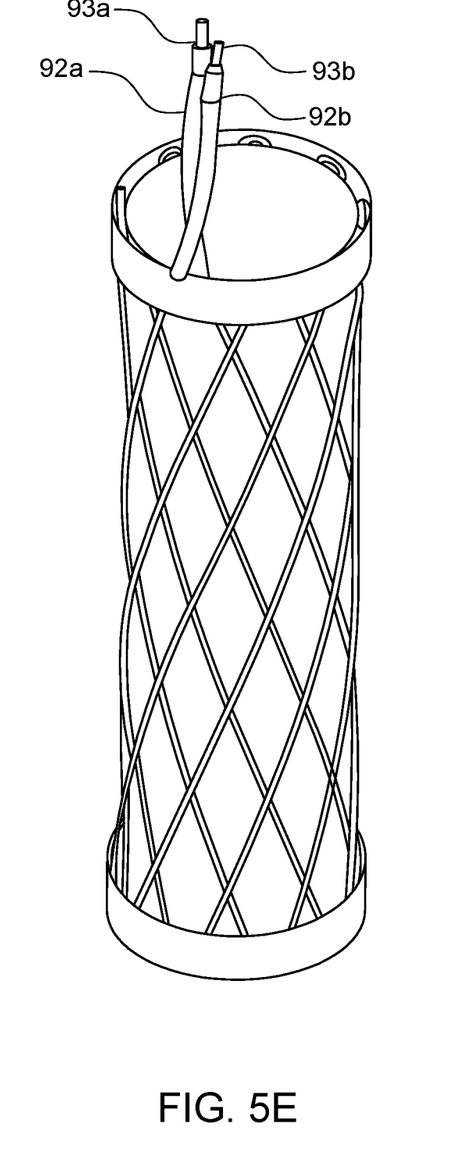
FIG. 5E is a perspective view of a partially assembled coil assembly shown in FIG. 4 according to a preferred embodiment of the invention, shown with insulation and connectors placed on the insulated leads of the coil.

The conductive wire 89 is then wound about the core around the anchor points 88 as shown in FIG. 5D. The wire is preferably a Litz Wire 200/38 which is approximately 312 inches long which allow each terminating lead 90a, 90b to be approximately 7 inches long. The wire 89 is wound about the anchor points in the numbered order of the anchor points as shown in FIG. 5D, resulting in a partial turn basketweave pattern as shown with nine (9) total turns. Alternatively, the winding is accomplished by starting at any anchor point on the upper cap 87a, then going $5/9^{ths}$ of a turn to an anchor point on the bottom cap 87b 200 degrees opposite from the starting point. The wire 89 is then wound back up to the upper cap 87a to the anchor point one step to the right of the starting point. Winding continues up and down to the anchor point one step to the right of the previous one until complete. The windings are then secured to the end caps 87a, 87b, by a non-conductive cover material such as vinyl tape rings 91a, 91b, respectively. As shown in FIG. 5E, the exposed lead wires 90a, 90b are protected by insulated tubing 92a, 92b, respectively, and connectors such as banana plugs 93a, 93b are affixed to the lead ends to affect connection to the coil driver 70.

The "basketweave" name refers to the look of the winding when the number of times the winding transverses the coil is more than the number of turns. The effect of the basketweave winding is to greatly reduce the effect of the back EMF from one wire on the adjoining wires. This reduces the impedance of the coil proportion to the increased separation of the wires in the winding. A reduced impedance for the same number of turns increases the current that can flow and this allows the creation of a larger field.

The driver of the present invention is able to operate at 72 to 400 volts on the H-bridge. Using the coil according to the preferred embodiment shown above, 72 volts will produce about 2× and 400 volts will produce just over 14× the power of prior art coil and driver assemblies while requiring only about 2× the power due to the efficient recirculation of energy as a result of the various features of this design.

Variations to the dimensions and specifications of the coil 80 can be implemented without departing from the scope of the invention. For example, a longer fifteen (15) inch solid core could be used in place of the twelve (12) inch hollow core 81 shown in FIG. 5A and FIG. 5B. One disadvantage of using a solid core is obviously the increased weight. Also, testing has confirmed that the twelve (12) inch hollow core design is lighter and produces superior results. Also, the winding pattern could be modified without departing from the spirit and scope of the invention. For example, instead of going a $5/8^{ths}$ of a turn from the upper cap to the lower cap to start the winding, one could go $2/3$ of a turn, or 2 turns prior to engaging an anchor point in the lower cap on the first winding turn. The outer diameter of the core and the inner diameter in the case of a hollow core may also be modified without departing from the spirit and scope of the invention. For example, instead of a hollow core having an inner diameter of 2.1 inches, it is contemplated to provide a hollow core with an inner diameter of 1.6 inches.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A long range coil and power source for a magnetic field generator comprising:
    a driver circuit having an input electrically coupled to a controller, said driver generating an electric current in response to electrical signals from the controller;
    a coil comprising a core and a conductive wire wound about said core in a basketweave pattern, wherein a first end and a second end of the conductive wire are electrically coupled to an output of said driver circuit for receiving said current to create a magnetic field; and
    a first end cap formed from a non-conductive material covering a first end of the coil and a second end cap formed from a non-conductive material covering a second end of the coil; wherein each end cap is provided with a plurality of anchor points such that the conductive wire is wound about the anchor points alternating between anchor points on the first end cap and anchor points on the second end cap such that the alternating anchor points are radially offset from one another and the wire is wound about the core in a single direction.

2. The long range coil and power source of claim 1 wherein the coil core comprises a magnetically permeable cylinder having a hollow center.

3. The long range coil and power source of claim 1 wherein said driver circuit is an H-bridge circuit, said H-bridge circuit further including a source impedance control network.

4. The long range coil and power source of claim 1 wherein the conductive wire:
    engages a first anchor point on the first end cap at a point proximate to a first end of the conductive wire;
    traverses the length of the coil to a second anchor point on the second end cap which is 200 degrees offset from the first anchor point on the first end cap, traverses the length of the coil to a third anchor point radially adjacent to the first anchor point on the first end cap;
    traverses the length of the coil repeating the above winding pattern for each additional anchor point on the first and second end caps; and
    engages the first anchor point on the first end cap at a point proximate to a second end of the conductive wire.

* * * * *